United States Patent

Bergmann et al.

[11] Patent Number: 6,049,412
[45] Date of Patent: Apr. 11, 2000

[54] REFLECTIVE FARADAY-BASED OPTICAL DEVICES INCLUDING AN OPTICAL MONITORING TAP

[75] Inventors: Ernest Eisenhardt Bergmann, Borough of Fountain Hill, Lehigh County; Terry William Cline, Bethlehem Township, Northhampton County; Stephen Kenneth Fairchild, Maxatawny Township, Berks County, all of Pa.

[73] Assignee: Lucent Technologies, Inc., Murray Hill, N.J.

[21] Appl. No.: 09/158,670

[22] Filed: Sep. 22, 1998

[51] Int. Cl.[7] ............................... G02B 26/08; G02F 1/29
[52] U.S. Cl. ..................... 359/301; 359/280; 359/283; 359/301; 359/298
[58] Field of Search ..................... 359/280–283, 359/298, 301.302, 304, 284; 356/218, 285, 358; 372/31, 106

[56] References Cited

U.S. PATENT DOCUMENTS

| 5,033,830 | 7/1991 | Jameson | 350/403 |
| 5,191,467 | 3/1993 | Kapany et al. | 359/341 |
| 5,471,340 | 11/1995 | Cheng et al. | 359/281 |
| 5,768,005 | 6/1998 | Cheng et al. | 359/281 |

*Primary Examiner*—Georgia Epps
*Assistant Examiner*—David N. Spector

[57] ABSTRACT

A reflective Faraday-based optical system is formed to include a partially transmissive optical reflector so that a portion of the optical signal propagating through the system will not be reflected but instead used as an input signal to a monitoring system. The partially transmissive reflector is configured to transmit only a relatively small portion of the optical signal (about 1–10%) so that the performance of the system is not affected. The optical monitoring arrangement may comprise one or more photodetectors, optical fibers, or other optical components for capturing the transmitted signal and converting into an electrical representation that can be evaluated to monitor the power in the optical signal.

11 Claims, 3 Drawing Sheets

REFLECTIVE FARADAY-BASED OPTICAL DEVICES INCLUDING AN OPTICAL MONITORING TAP

BACKGROUND OF THE INVENTION

The present invention relates to reflective Faraday-based optical devices and, more particularly, to such devices including a partially transmissive reflector element and photodetection arrangement to monitor the optical signals propagating through the device.

DESCRIPTION OF THE PRIOR ART

There are many optical devices that require a "non-reciprocal" rotation of the optical signal traversing the system—optical isolators and circulators exemplify such devices. Faraday rotators, such as garnet films, are often used to provide this non-reciprocal rotation. In the interest of reducing the size of such systems, "reflective" isolators and circulators have been developed that essentially halve the number of required components by including a reflector at the midpoint of a conventional arrangement and thus reflect the optical signal back through the same components. U.S. Pat. No. 5,191,467 issued to Kapany et al. on Mar. 2, 1993 discloses an exemplary prior art reflective optical isolator. A circulator incorporating a reflective component is disclosed in U.S. Pat. No. 5,471,340.

A separate interest exists in the capability to constantly monitor the optical power within optical devices as a means to monitor and maintain proper functioning of optical systems. There exist other arrangements that utilize reflections within an optical system as "tap" signals that are thereafter coupled to monitoring equipment to analyze the operation of the system.

A need remains in the art for incorporation such an optical tap arrangement in reflective Faraday-based optical systems, where the reflections available in prior art systems are not as prevalent.

SUMMARY OF THE INVENTION

The need remaining in the prior art is addressed by the present invention, which relates to reflective Faraday-based optical devices and, more particularly, to such devices including a partially transmissive reflector element and photodetection arrangement to monitor the optical signals propagating through the device.

In accordance with the present invention, the reflective element/mirror included in the prior art arrangements mentioned above is replaced by a partially transmissive reflective element. Such elements, for example, a multi-layer thin film stack of proper design, allow for approximately 90% of the signal to be reflected and about 10% to be transmitted. By reflecting a majority of the signal, the system maintains sufficient optical signal strength to operate properly, while a 10% transmissive factor is more than sufficient to allow for the signal quality to be analyzed. In other embodiments, a 99% reflectivity and 1% transmission may be appropriate. In general, any appropriate split between reflected and transmitted signal may be used and is considered to fall within the scope of the preset invention.

In one embodiment, a single large-size photodetector may be used to monitor optical signals traveling in either direction through the optical device. Alternatively, separate monitors can be used to detect signals traveling in the "forward" and "reverse" directions, respectively.

Additional elements such as lenses, polarizers, filters, etc. may be disposed in the signal path between the partially transmissive reflector and the photodetector to further modify the optical tap signal.

Other and further features of the present invention will become apparent during the course of the following discussion and by reference to the accompanying drawings.

BRIEF DESCRIPTION OF THE DRAWINGS

Referring now to the drawings, where like numerals represent like components in several views.

DETAILED DESCRIPTION

Figure 1:
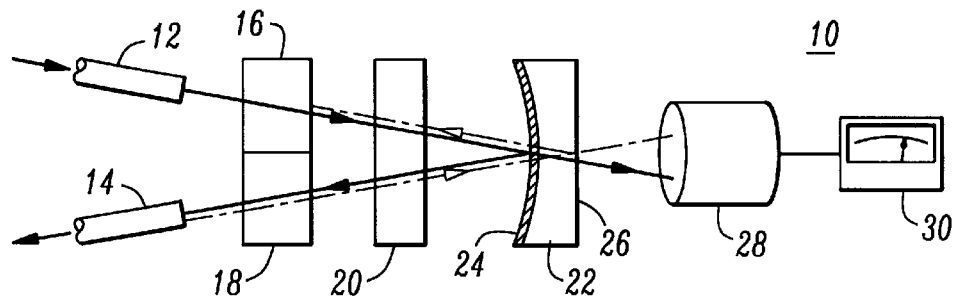
FIG. 1 illustrates an exemplary reflective Faraday-based optical isolator incorporating an optical tap arrangement of the present invention including a single photodetecting device.

An exemplary optical system 10 incorporating the optical tap arrangement of the present invention is illustrated in FIG. 1. System 10 is defined as a reflective optical isolator and includes an input signal path 12 and output signal path 14. As is well-known in the art, an optical isolator functions to allow signals propagating in the "forward" direction to travel unimpeded, while blocking any signals traveling in the "reverse" direction from being coupled into the input signal path. In the arrangement of FIG. 1, therefore, optical signals (whose polarization allows them to pass through polarizer 16) coupled into input path 12 will propagate through the system and exit along output signal path 14, while any signals injected into signal path 14 will be prevented from entering signal path 12. As shown, system 10 further comprises a linear polarizer 16 disposed along input signal path 12 and oriented at a predetermined angle θ, and an analyzer 18 oriented at θ+45° and disposed along output signal path 14. A Faraday rotator 20 is disposed in the signal path beyond both devices 16 and 18. Since this is a "reflective" system, an input signal will traverse Faraday rotator 20 twice; once in the "forward" direction and once in the "reverse" direction. As such, Faraday rotator 20 is devised to impart only a 22.5° rotation to the signal on each pass (thus resulting in a complete 45° rotation after both passes). The arrangement of the present invention therefore provides transmission in the forward direction (i.e., rotation from θ to θ+45°) and isolation in the reverse direction (i.e., rotation from θ+45° to θ+90°).

In accordance with the present invention, a partially transmissive reflector 22 is disposed in the signal path beyond Faraday rotator 20. Partially transmissive reflector 22 includes a concave, reflective front surface 24 that functions to properly re-direct and refocus the reflected portion of the optical signal from the "upper" portion of Faraday rotator 20 into the "lower" portion, as illustrated in FIG. 1. Importantly, due to the partially transmissive nature of reflector 22, a portion of the optical signal will pass through reflector 22 and exit through its rear surface 26 (in one embodiment, rear surface 26 may include an antireflective coating). For the purposes of the present invention, a partially transmissive device that reflects approximately 90% of the signal and transmits approximately 10% is appropriate (as mentioned above, other combinations are possible, such as 99/1, 95/5, etc.). As shown, the transmitted portion of the optical signal thereafter impinges a large area photodetector 28, which converts the captured optical signal into an electrical representation and provides the electrical output as a monitoring signal to a monitoring device, such as meter 30. Due to the size of photodetector 28 with respect to the optical signal paths, alignment of detector 28 with respect to partially transmissive reflector 22 is trivial.

As described above, an optical isolator functions to block any un-intended signals propagating in the reverse direction through the device from being injected into the input signal path (signal path 12 for the arrangement of FIG. 1). A reverse-propagating signal is illustrated by the dashed line in FIG. 1. Since this signal will not yet be blocked as it passes through partially transmissive reflector 22, a portion of this reverse-directed signal will also impinge photodetector 28. For some cases, this is of no concern. However, in certain circumstances it may be desirable to be able to distinguish the monitoring of forward-directed signals from reflections passing in the reverse direction through the optical system.

Figure 2:
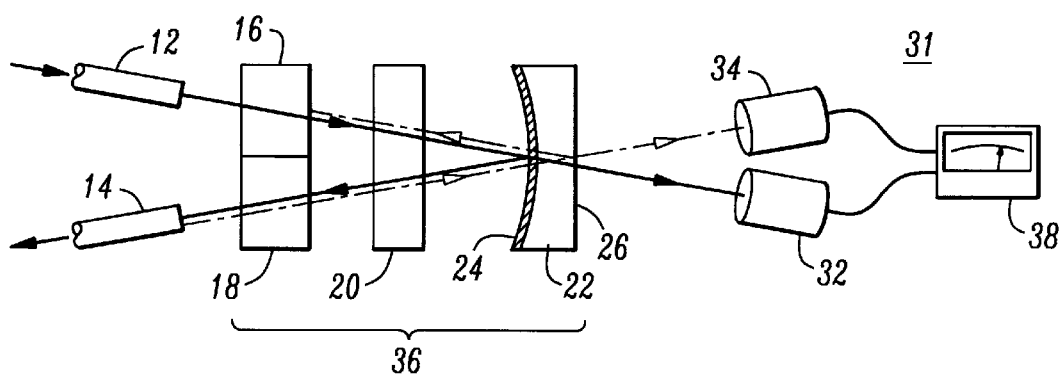
FIG. 2 illustrates an alternative optical isolator arrangement, including an optical tap of the present invention including a pair of photodetecting elements.

FIG. 2 illustrates an alternative embodiment of the present invention that utilizes a pair of large area photodetectors 32, 34 in place of the single large area photodetector 28. Optical system 36 of FIG. 2 includes the same optical components as discussed above in associated with FIG. 1 and need not be described again. As illustrated, however, by using a pair of photodetectors, it is possible to separately monitor the power of an optical signal propagating in the forward direction (i.e., from signal path 12) and any return signal propagating in the reverse direction (i.e., from signal path 14). In particular, a transmitted portion of an optical signal propagating in the forward direction will exit partially transmissive reflector 22 and impinge a first photodiode 32, where photodiode 32 is properly aligned with respect to reflector 22 to capture only the forward-directed signal. Photodiode 32 functions to convert this signal into an electrical equivalent which is thereafter provided as an input to a monitoring arrangement 38. Any return optical signal passing through reflector 22 will be coupled into a second photodiode 34, as shown in FIG. 2 and converted into an electrical signal applied as an input to monitoring arrangement 38.

Figure 3:
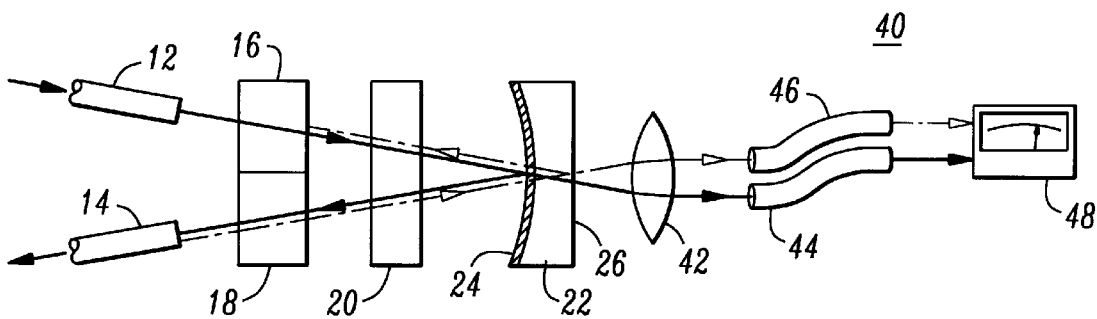
FIG. 3 illustrates an exemplary reflective Faraday-based optical isolator and optical tap arrangement, including lensing disposed between the partially transmissive reflector and a pair of photodetecting devices.

In some optical systems it may be problematical to locate photodetectors in such close proximity to the partially transmissive reflector. FIG. 3 illustrates an optical system 40 that provides for a more "remote" monitoring arrangement. As shown, the optical tap arrangement of system 40 includes a focusing means 42 (for example, a lens) disposed in the signal path beyond partially transmissive reflector 22. A first optical fiber 44 is positioned at a first image point beyond focusing means 42 and is located so that the forward-directed signal will be focused into the core region of fiber 44. Similarly, a second optical fiber 46 is positioned at another image point associated with focusing means 42 such that any reflected signal will be coupled into second fiber 46. Fibers 44 and 46 may then extend as far as necessary to a "remotely located" monitoring arrangement 48, where monitoring arrangement 48 may comprise photodetectors and an electrical signal monitor, as described above. Fibers 44 and 46 may comprise either multimode fiber or single mode fiber, where the larger core size associated with multimode fiber will simplify the alignment of the fibers with respect to focusing means 42. Indeed, elements 44 and 46 may comprise any suitable type of optical waveguide capable of supporting the transmission of the optical signals to a remotely located monitoring arrangement. For the purposes of the present discussion, elements 44 and 46 will be referred to as "fibers", but it is to be understood that any suitable type of waveguide may be used.

Figure 4:
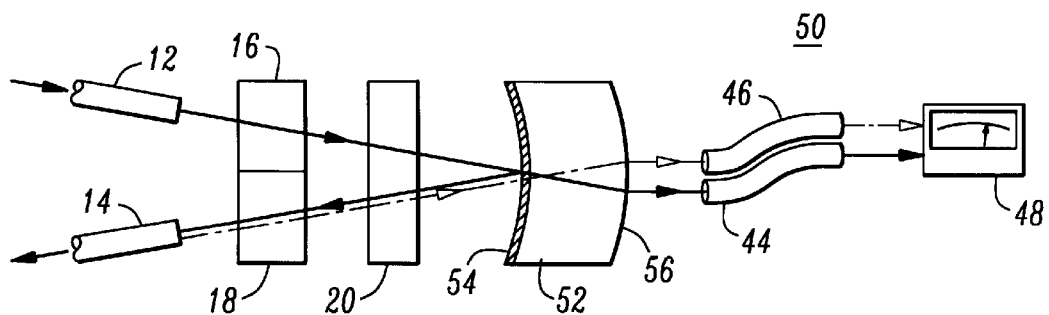
FIG. 4 is an alternative embodiment of the arrangement of FIG. 3, incorporating the lensing element into the partially transmissive reflector.

Further, focusing means 42 could comprise any suitable arrangement, including but not limited to, a curved lens or curved mirror. Alternatively, focusing means 42 may be incorporated into the partially transmissive reflector. FIG. 4 illustrates an optical system 50 where individual components 22 and 42 of system 40 are replaced by a single partially transmissive reflector 52. As shown in FIG. 4, partially transmissive reflector 52 is formed to include a reflective front surface 54 and a curved rear surface 56, where the curvature of surface 56 is sufficient to provide the necessary focusing into monitoring fibers 44,46.

Figure 5:
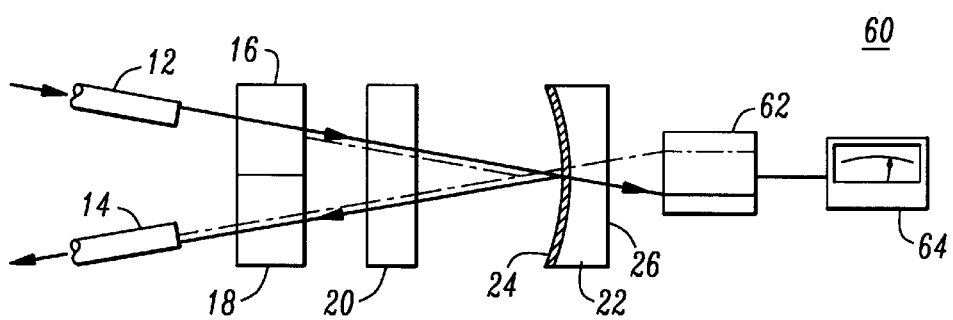
FIG. 5 is an exemplary reflective Faraday-based optical isolator and optical tap arrangement, including additional optical components (such as a polarizer or filter) disposed in the signal path between the partially transmissive reflector and the photodetecting arrangement.

Components other than focusing arrangements may be included in the optical tap monitoring system of the present invention. FIG. 5 illustrates an exemplary system 60 that includes a generalized optical component 62 disposed between partially transmissive reflector 22 and a detector arrangement 64 (detector arrangement 64 may comprise any of the various arrangements described above, as well as any other suitable optical detection arrangement). In one embodiment, component 62 may comprise an optical filter. When used in conjunction with an optical amplifier, an optical filter is useful in separating the pump wavelength from the signal wavelength so that the detector arrangement monitors only the signal power and ignores the pump power (or vice versa, if desired). An optical filter may also be used in a wavelength division multiplexed system to distinguish among the various wavelengths comprising the system. Alternatively, component 62 may comprise a polarizer so that when used with an isolator or circulator, the detection arrangement is capable of distinguishing (either partially or totally) "forward" signals from "reflected" signals. Since the polarization of the forward and backward signals are different, one direction may be "rejected" by a suitable analyzer 62 (that may function to partially attenuate the desired signal propagating in the remaining direction). Combinations of focusing means with these components is also possible and is considered to fall within the spirit and scope of the present invention.

Figure 6:
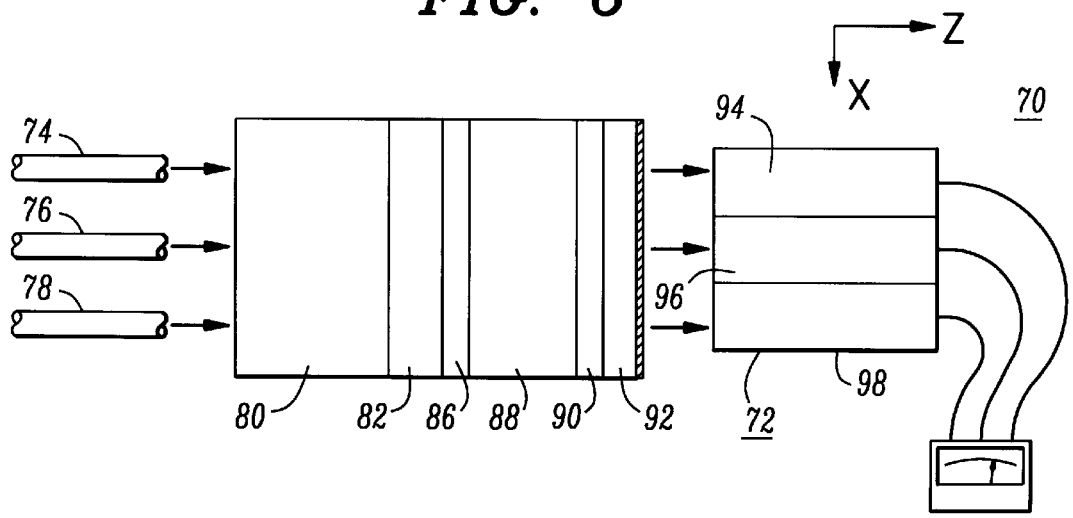
FIG. 6 is an exemplary reflective Faraday-based optical circulator including an optical tap arrangement of the present invention.
Figure 7:
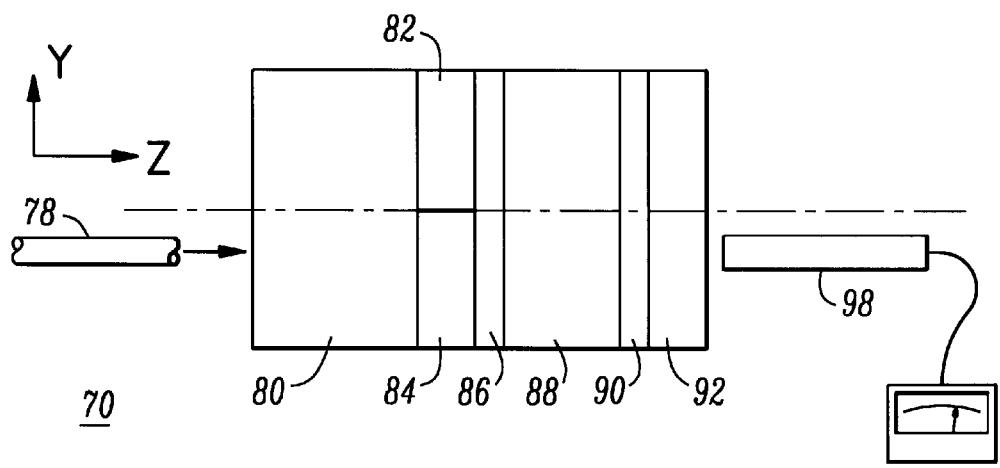
FIG. 7 is a side view of the arrangement of FIG. 6, illustrating the positioning of the optical ports relative to the first walk-off device.

There are other Faraday-based reflective optical systems that may include an optical tap arrangement of the present invention. FIG. 6 illustrates an exemplary optical partial circulator 70 including a three-tap optical monitoring arrangement 72. The view illustrated in FIG. 6 is a top view of partial circulator 70, in the x-z plane of the device. A side view of partial circulator 70 is illustrated in FIG. 7, this view being taken along the y-z plane. As shown in the view of FIG. 6, partial circulator 70 includes a set of three optical signal ports 74, 76 and 78, disposed as shown at a first end of circulator 70. In general, a first signal injected into port 74 will propagate through the system and exit at port 76.

Similarly, a signal injected into port 76 will propagate through the system and exit at port 78. The particular partial circulator arrangement of FIGS. 6 and 7 includes a first walk-off device 80. Device 80 is, for example, a birefringent crystal that functions to separate the polarization components of signals exiting any of the signal ports 74, 76 or 78 and, in the reverse direction, will combine the separate polarizations for signals to be coupled into ports 74, 76 or 78 (lensing elements may be disposed between the input signal ports and device 80 to provide additional focusing). Disposed beyond walk-off device 80 is a pair of half-wave plates 82,84, where the position of these plates is best shown in FIG. 7. Referring to FIG. 7, the position of input signal ports 74,76 and 78 relative to half-wave plates 82,84 is evident. That is, the set of ports are disposed below the center line C of partial circulator 70, the center line defined by the line of demarcation between upper half-wave plate 82 and lower half-wave plate 84. In particular, upper half-wave plate 82 is positioned with its "fast" and "slow" axes off-parallel by 22.50 to the y and x axes, respectively. In contrast, lower half-wave plate 84 is oriented at an angle of 22.5° in the opposite direction with respect to the x axis. Therefore, the polarizations of the upper and lower beams are effectively rotated by ±45°, respectively. Since these two beams were originally polarized vertically and horizontally, they now have parallel polarizations at 45° to the vertical. A first Faraday rotator 86 is disposed beyond the pair of half-wave plates 82,84 and provides a 45° clockwise rotation to each signal component passing therethrough so that both signal components are vertically polarized. The components exiting first Faraday rotator 86 are then coupled into a second birefringent device 88. The beam shift axis of device 88 is oriented parallel to the X axis, allowing the components to pass through unchanged. A second Faraday rotator 90, disposed beyond device 88, provides an additional 45° rotation to each component before reflection and again after reflection. The reflected beams are now horizontally polarized and are shifted over to the next port position as they re-traverse device 88.

In accordance with the present invention, the signal components thereafter encounter a partially transmissive reflector 92. As with the other embodiments described above, a majority of the optical signal will be reflected by device 92, and propagate back the partial circulator 70 in the reverse direction (such that a signal originating from signal path 74 will be injected into signal path 76, for example). The transmitted portion of the optical signal then enters a first optical monitoring arrangement 94 of monitoring system 72, where first optical monitoring arrangement 94 may comprise any suitable form discussed above (such as, but not limited to, a large area photodiode, lensed diode, optical fiber, etc.). In a similar manner, a signal entering second port 76 will pass through partial circulator 70 and a transmissive portion will be coupled into a second optical monitoring arrangement 96 and, similarly, a signal coupled into third port 78 will be monitored by a third optical monitoring arrangement 98.

Figure 8:
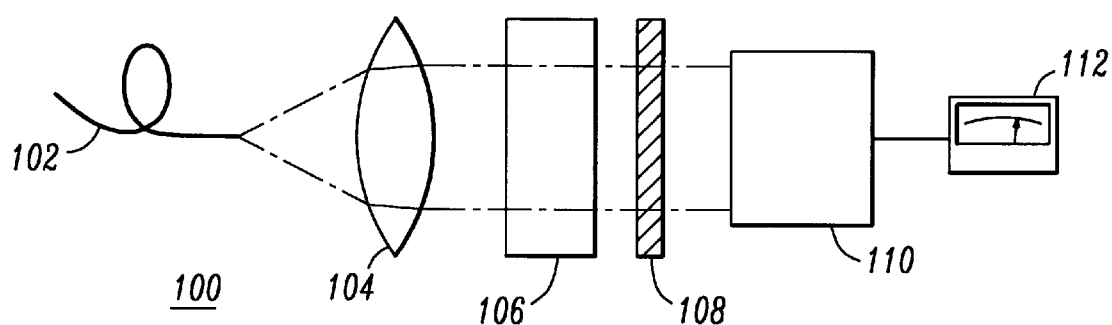
FIG. 8 illustrates an exemplary arrangement of the present invention utilized as a Faraday reflector.

FIG. 8 illustrates an optical system 100, including a Faraday reflector, with a detector arrangement 110 of the present invention. As shown, an optical fiber 102 is used to provide the input optical signal. The optical signal thereafter propagates through a focusing means 104, such as collimating lens, and a Faraday rotator 106. Faraday rotator 106 provides a 45° clockwise rotation on each polarization component passing through. A partially transmissive device 108 is disposed beyond Faraday rotator 106 and functions to allow only a relatively small portion of the optical signal to pass through to detector arrangement 110. The remainder of the optical signal will be reflected, rotated another 45° by Faraday rotator 106 and be re-injected into path (or port) 102. The transmitted portion of the signal entering monitor 112 is then used to assess the performance of the system.

It is to be understood that the optical tap monitoring system of the present invention may be used with any Faraday-based reflective optical system and, further, various other isolator and circulator arrangements besides those illustrated may be utilized with the optical tap monitoring system of the present invention.

What is claimed is:

1. A reflective Faraday-based optical system for conveying an optical signal from an input signal port to an output signal port, said system comprising a Faraday rotator disposed in the signal path between said input port and said output port;

a partially transmissive reflector disposed in the optical signal path beyond said Faraday rotator for re-directing an optical signal exiting said Faraday rotator through said Faraday rotator in the reverse direction, said reflector also for providing a portion of said optical signal as a transmitted optical signal in a second path distinct from said reflected signal; and an optical monitoring arrangement disposed beyond said partially transmissive reflector for capturing said transmitted optical signal and generating an output signal representative of the power of said optical signal, said monitoring arrangement comprising a pair of photodiodes, a first photodiode for capturing an optical signal propagating through said optical system in a forward direction and a second photodiode for capturing an optical signal propagating through said optical system in a reverse direction.

2. A reflective Faraday-based optical system for conveying an optical signal from an input signal port to an output signal port said system comprising a Faraday rotator disposed in the signal path between said input port and said output port;

a partially transmissive reflector disposed in the optical signal path beyond said Faraday rotator for re-directing an optical signal exiting said Faraday rotator through said Faraday rotator in the reverse direction, said reflector also for providing a portion of said optical signal as a transmitted optical signal in a second path distinct from said reflected signal;

an optical monitoring arrangement disposed beyond said partially transmissive reflector for capturing said transmitted optical signal and generating an output signal representative of the power of said optical signal; and at least one optical processing component disposed in the signal path between the partially transmissive reflector and the optical monitoring arrangement for discriminating between optical signals based upon predetermined optical properties.

3. An optical system as defined in claim 2 wherein the at least one optical processing component is capable of discriminating between signals based upon propagation direction.

4. An optical system as defined in claim 2 wherein the at least one optical processing component is capable of discriminating between optical signals based upon the polarization states of the optical signals.

5. An optical system as defined in claim 2 wherein the at least one optical processing component is capable of discriminating between optical signals based upon optical wavelength.

6. An optical system as defined in claim 2 wherein the at least one optical processing component comprises a focusing element; and the optical monitoring system comprises a pair of optical waveguides disposed in proximity to each image point of said focusing element.

7. An optical system as defined in claim 6 wherein the optical monitoring system further comprises photodetecting means coupled to receive the output from the pair of optical waveguides and convert the optical signals into electrical equivalent; and monitoring means for receiving the electrical output signals from said photodetecting means and generating a monitoring signal representative of the power of the optical signal.

8. An optical system as defined in claim 6 wherein the optical monitoring system comprises an input optical waveguide disposed in proximity to a first image point of said focusing lens.

9. An optical system as defined in claim 8 wherein the optical monitoring system further comprises photodetecting means coupled to receive the output from the input optical waveguide and convert the optical signals into electrical equivalent; and monitoring means for receiving the electrical output signals from said photodetecting means and generating a monitoring signal representative of the power of the optical signal.

10. An optical system as defined in claim 2 wherein the at least one optical processing component comprises a filter for separating multiple wavelengths present in an optical signal so as to allow for only a predetermined set of wavelengths to be transmitted through to the optical monitoring arrangement.

11. An optical system as defined in claim 2 wherein the optical component comprises a polarizer for blocking a predetermined polarization direction to pass into the optical monitoring arrangement.

* * * * *